Nov. 4, 1952  J. B. McPHERSON  2,616,414
INTAKE CONSTRUCTION FOR INFANT INCUBATORS
Filed Aug. 6, 1949
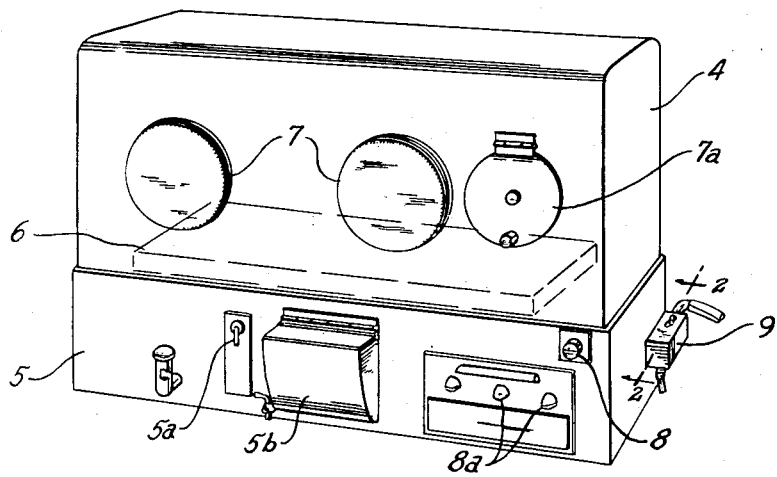
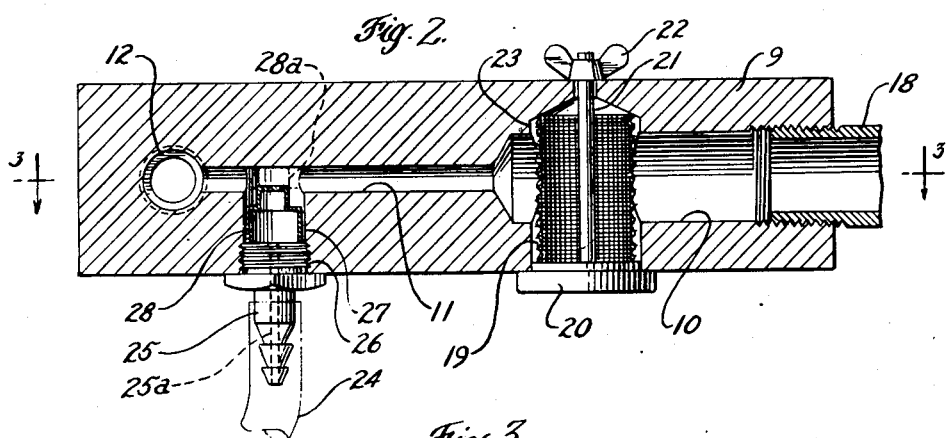
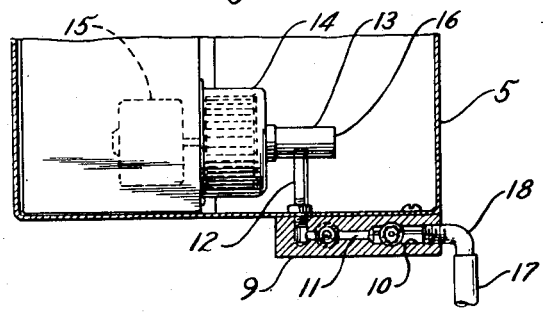
INVENTOR
John B. McPherson
BY
Harris S. Campbell
ATTORNEY Patented Nov. 4, 1952

2,616,414

UNITED STATES PATENT OFFICE 2,616,414

INTAKE CONSTRUCTION FOR INFANT INCUBATORS

John B. McPherson, Abington, Pa., assignor, by mesne assignments, to Children's Hospital of Philadelphia, Philadelphia, Pa., a corporation of Pennsylvania Application August 6, 1949, Serial No. 108,881

5 Claims. (Cl. 128—1)

This invention relates to improvements in the construction of infant incubators and is particularly concerned with the construction of the intake system for supplying air, oxygen and the like to the incubator circulation system.

Incubators of this nature are used for the isolation of small infants who require special care such as those which are prematurely born and require confinement in an atmosphere at higher than normal temperature and humidity. Incubators of this nature are also used for isolation in the treatment of certain ailments where controlled temperature, humidity and special atmospheric conditions for respiration may be desired. In order to provide proper atmospheric conditions within the enclosure, circulating, heating or cooling, and humidifying apparatus are required. This may conveniently be provided in the form disclosed in a co-pending United States application, Serial No. 108,825, filed August 5, 1949. With systems of this nature fresh air from an outside source is normally provided through a suitable hose or pipe connected into the intake manifold of the circulating fan. When it is desired to introduce oxygen or other gas for medical reasons this may be supplied through the medium of the air intake system.

One of the objects of the present invention is to provide an intake unit of improved construction suitable for mounting in a convenient and accessible location on the incubator.

Another object of the invention is to provide a simple filter member in the intake system which will effectively remove dirt and dust particles from the incoming air, the filter member being readily removable for cleaning purposes. A feature of this improved filter arrangement includes the construction which prevents the danger of shutting off of the fresh air supply in case the filter unit becomes clogged with dirt.

A further object of the invention is the provision of a simple automatic valve mechanism in the air intake unit to provide for properly proportioning the amount of air delivered to the intake system when oxygen is being supplied to the system. This valve construction includes a member which is adapted to operate automatically upon application of the delivery of oxygen in a fashion to partially close the air delivery intake to compensate for the amount of oxygen being introduced. Upon removal of the application of the oxygen the valve mechanism functions automatically to seal the intake opening through which the oxygen enters and to provide unrestricted passage for the air delivery to the circulating fan.

How the foregoing and other objects and advantages of the invention are accomplished will be evident from the following description of the drawings in which—

Figure 1 is a perspective view of an incubator of the type to which the present invention may be applied and illustrates the intake unit located in a suitable position.

Figure 2 is a longitudinal sectional view taken generally in the direction of arrows 2—2, Figure 1, through the body of the intake unit.

Figure 3 is a plan view through a portion of the lower unit of the incubator and valve unit showing the relative location of the intake unit and the circulating fan, certain parts being shown in section.

Referring to the figures, it will be observed that the incubator illustrated in Figure 1 incorporates an upper portion 4 forming the occupant's enclosed chamber and a lower unit 5 which contains the circulating and conditioning equipment. A mattress 6 is shown resting on the floor of the occupant's chamber. Hand holes 7 and access opening 7a are provided in the front of the compartment to permit an attendant to care for the infant without danger of contamination from the outside. The pressure within the occupant's chamber is normally maintained at a slightly higher value than the outside room air thereby preventing ingress of air from the room to the occupant's compartment when the access door 7a is momentarily opened. On the front of the lower unit 5 there are shown the humidifier control 5a, the ice chamber access chute 5b, the thermostat control 8 and the indicator lights 8a.

The air intake control unit is illustrated at 9 in Figure 1 where it is conveniently mounted at one end of the lower unit 5 close to the location of the circulating fan as will be more clearly evident by reference to Figure 3. Here it will be seen that the intake unit 9 incorporates a passageway 10 and a passage of reduced diameter 11 which leads to the pipe 12 connected to the intake manifold 13 of the fan 14. Fan 14 is driven by an electric motor indicated at 15. The fresh air drawn in through the intake pipe 12 constitutes only a portion of the air circulated by the fan 14, the remainder being recirculated air from the occupant's chamber which is taken into the manifold 13 through the open end 16.

The fresh air supplied from the outside is delivered to the intake unit through a hose or pipe 17. This is connected to the elbow 18 which is threaded into the intake unit 9. In this way the location of the hose 17 may be adjusted to permit it to run in any direction such as down toward the floor or out to one side. This adjustment is obtained by rotating the elbow unit 18 on its threaded attachment.

As will be most clearly seen from Figure 2, the air intake unit 9 incorporates a filter screen assembly for the purpose of removing dirt and dust from the incoming air. The filter screen is made in the form of a cylindrical screen element 19 having a relatively large diameter, preferably larger than the diameter of the incoming air duct 10. The area of the incoming duct 10 is made much larger than necessary for the supply of air required to the incubator for the purpose of exposing a large area of the filter to the air stream. The provision of a large area of filter assures trouble-free operation over a long period of time and eliminates the need for frequent removal of the filter for cleaning. The screen is readily removable for cleaning purposes since it is retained in position by a lower cover plate 20 to which is attached the bolt member 21. This supports the screen by means of the external thumb-nut 22 which is conveniently mounted on the top side of the air intake unit.

It should also be noted that the cylindrical hole 23 which is provided in the body of the intake unit 9 and into which the cylindrical filter 19 is inserted is somewhat larger in diameter than the diameter of the filter unit 19. Thus air can actually pass around the surface of the screen 19. This construction is provided as a safety measure so that in the event that the filter is not properly serviced and becomes clogged the air flow is not cut off. The fact that there is space around the outside of the filter unit does not detract from its effectiveness in removing dirt from the air since the diameter of the filter is as large or larger than the diameter of the incoming air stream. Thus the momentum of the incoming dust particles will carry them into contact with the filter screen where they are entrapped. This construction has been found to be completely effective as an air cleaner and assures that under no condition can the supply of air to the incubator be closed off.

The addition of a gas such as oxygen to the air used in the incubator may be supplied through a hose such as indicated at 24 and which may be attached to the nipple 25. Nipple 25 is fastened to bottom of the body of the intake unit 9 by means of a threaded connection 26 which leads to the relatively large diameter opening 27. A hole 25a in the nipple 25 provides for the delivery of the oxygen through the nipple. A hollow valve member 28 normally rests on the upper surface of the nipple 25 and seals the opening 25a against the escape of air which may be passing into the incubator through the intake channels 11 and 12. It will be noted that the valve member 28 consists of two cylindrical portions, the upper of which is smaller in diameter than the lower. The diameter of the lower main portion of the valve 28 is somewhat smaller than the diameter of the hole 27. Upon the admission of oxygen through the nipple 25 the pressure of the incoming gas lifts the valve member 28 to the upper dotted outline position 28a so that it is free from the seat and the incoming oxygen passes around the valve 28 into the air stream. The upper portion of the valve 28 is proportioned to restrict the flow of air through the channel 11 so that the proportion of oxygen in the gas mixture entering the incubator through pipe 12 may be greatly increased. When the oxygen flow through the nipple 25 is stopped, the valve member 28 automatically drops back through the influence of gravity to seal the opening 25a and reestablish unrestricted flow of air through the channel 11.

This method of providing for the supply of oxygen or other gas to the incoming air has been found to be highly efficient since it permits accurate control of the oxygen concentration. The normal air flow is restricted to an extent where high concentration of oxygen may be obtained in the occupant's chamber. For example, with this type of valve construction, if the normal air flow is 10 litres per minute and oxygen is introduced through the nipple 25 at the rate of 4 litres per minute, the restrictor valve causes reduction of the intake air to a rate of approximately 6 litres per minute. In this way the normal volume may be maintained and the proportion of oxygen to air may be accurately controlled to the desired amount. The simple construction of the valve assures reliable automatic operation.

From the above it will be seen that I have provided an improved air intake unit for use with infant incubators which is not only simple in construction but completely safe in operation. By properly proportioning the intake air channel with respect to the filter unit, a large area filter capable of giving effective and trouble-free service is provided. By the cylindrical construction and mounting arrangement described, a rugged unit is provided which is easily removable for cleaning without special tools and which cannot readily be damaged during the cleaning operation. The proportioning of the filter unit and its mounting cavity further assures that sufficient air can be delivered through the intake system even if the filter should become clogged. The simple automatic valve included in the intake unit for the admission of oxygen or other gas ensures a proper control of the volume of air being admitted with the gas. The automatic closing action of this valve prevents the entry of air through the oxygen intake when it is not in use.

I claim:

1. An air intake device for an infant incubator having a body member with a large diameter passage, said body having a cylindrical cavity therein with its axis intersecting the axis of said large diameter passage, the diameter of the cavity being larger than the diameter of said passage, a cylindrical filter unit extending the full length of the cavity and having a diameter at least as large as the diameter of said passage but smaller than the diameter of said cavity, and a device for retaining said filter unit in position in the cavity.

2. For an infant's incubator having a forced air circulation system, an intake unit incorporating a body member, said body member having an air passage therein, said body having a passageway leading from the outside thereof to said air passage, the axis of said passageway being approximately vertical, a closure valve member for said passageway adapted to be actuated by means of gravity for closing said passageway and actuated to open position for introduction of an auxiliary gas into said air passage by the application of gas pressure.

3. For an infant incubator having a forced air circulation system, an intake unit incorporating a body member having an air passage therein, said body having another channel connecting with said air passage for the introduction of a gas such as oxygen, said channel being of a larger cross-sectional area than said air passage and having a valve member located therein, said valve member having an extension thereon adapted to enter said air passage for restricting flow therethrough when said valve is in position to permit delivery of gas through said channel.

4. An air intake device for an infant incubator having a body member with a small diameter air passage therein, said body member also having an aperture of larger diameter than said air passage and connecting therewith, a valve member mounted for axial motion in said aperture, said valve member having a body composed of cylindrical portions of two different diameters, the larger diameter being slightly smaller than the diameter of said aperture.

5. An infant incubator having an air intake device incorporating a body member with a small diameter air passage therein, said body member having a second larger diameter passage intersecting the air passage for the purpose of introducing a gas such as oxygen into the air intake, a valve member for controlling the flow of gas through both of said passages, said valve member being composed of light-weight shell construction having two different diameters.

JOHN B. McPHERSON.

REFERENCES CITED

The following references are of record in the file of this patent:

UNITED STATES PATENTS

| Number | Name | Date |
|---|---|---|
| 738,088 | Vauclain | Sept. 1, 1903 |
| 1,115,784 | Cranwell et al. | Nov. 3, 1914 |
| 1,156,963 | Woods | Oct. 19, 1915 |
| 1,917,203 | Heinz | July 4, 1933 |
| 2,243,999 | Chapple | June 3, 1941 |